(12) United States Patent
Oka

(10) Patent No.: US 7,250,774 B2
(45) Date of Patent: Jul. 31, 2007

(54) FINGERPRINT SENSOR

(75) Inventor: Shuichi Oka, Kanagawa (JP)

(73) Assignee: Sony Corporation, Tokyo (JP)

( * ) Notice: Subject to any disclaimer, the term of this patent is extended or adjusted under 35 U.S.C. 154(b) by 628 days.

(21) Appl. No.: 10/450,146

(22) PCT Filed: Sep. 11, 2002

(86) PCT No.: PCT/JP02/09283

§ 371 (c)(1),
(2), (4) Date: Sep. 26, 2003

(87) PCT Pub. No.: WO03/028553

PCT Pub. Date: Apr. 10, 2003

(65) Prior Publication Data

US 2004/0051155 A1   Mar. 18, 2004

(30) Foreign Application Priority Data

Sep. 26, 2001   (JP) ............................ 2001-294253

(51) Int. Cl.
*G01R 27/26* (2006.01)
*G06K 9/24* (2006.01)

(52) U.S. Cl. ................ 324/671; 324/690; 324/686; 382/124

(58) Field of Classification Search ........... 324/671, 324/686, 690, 662
See application file for complete search history.

(56) References Cited

U.S. PATENT DOCUMENTS

| 4,643,914 | A | * | 2/1987 | D'Avitaya et al. .......... 438/660 |
| 5,325,442 | A | * | 6/1994 | Knapp .................... 382/124 |
| 5,862,248 | A | * | 1/1999 | Salatino et al. ............ 382/124 |
| 6,261,386 | B1 | * | 7/2001 | Perepezko et al. .......... 148/302 |
| 6,693,441 | B2 | * | 2/2004 | Lane et al. ................ 324/662 |
| 6,995,048 | B2 | * | 2/2006 | Yoneda et al. ............. 438/149 |
| 2003/0136960 | A1 | * | 7/2003 | Goodman et al. ............ 257/40 |
| 2004/0087067 | A1 | * | 5/2004 | Yoneda et al. ............. 438/148 |
| 2005/0285178 | A1 | * | 12/2005 | Abbott et al. .............. 257/315 |
| 2006/0097735 | A1 | * | 5/2006 | Ebihara .................... 324/662 |
| 2006/0119369 | A1 | * | 6/2006 | Kawahata et al. .......... 324/662 |
| 2006/0157710 | A1 | * | 7/2006 | Lee et al. ................. 257/72 |

FOREIGN PATENT DOCUMENTS

| JP | 2000-266506 | | 9/2000 |
| JP | 2001-120519 | | 5/2001 |
| JP | 2001-133213 | | 5/2001 |
| JP | 2001133213 | * | 5/2001 |

* cited by examiner

*Primary Examiner*—Anjan Deb
(74) *Attorney, Agent, or Firm*—Robert J. Depke; Rockey, Depke, Lyons & Kitzinger LLC.

(57) ABSTRACT

The present invention relates to a fingerprints detection apparatus by a capacitance detection method. The fingerprints detection apparatus of the present invention includes a sensor portion in which an insulating protection film is formed so as to cover detection electrodes arranged like an array, and the detection electrodes and the wiring beneath the detection electrodes are formed of a refractory metal or a compound of the refractory metal. This structure heightens the Vickers hardness of the detection electrodes and the wiring. This makes it possible to provide a highly reliable fingerprints detection apparatus in which a tolerance to cracks of the insulating protection film in the sensor portion is improved.

4 Claims, 4 Drawing Sheets

FINGERPRINT SENSOR

This application claims priority to International Application No. PCT/JP02/09283, filed Sep. 11, 2002, and Japanese Patent Application Number JP2001-294253, filed Sep. 26, 2001, each of which are incorporated herein by reference.

TECHNICAL FIELD

The present invention relates to a fingerprints detection apparatus by a capacitance detection method, particularly to detection electrodes and the wiring in a sensor portion of the apparatus.

BACKGROUND ART

A fingerprints detection apparatus by a capacitance detection method as shown in FIG. 7 is known (see, for example, Gazette of U.S. Pat. No. 5,325,442). The fingerprints detection apparatus includes a sensor portion, what is called a fingerprints sensor chip 2 in which a plurality of detection electrodes 4 are arranged like an array on the surface of a semiconductor substrate 3 through an insulation film 5, and an insulating protection film (surface protection film) 6 is formed so as to cover those detection electrodes 4. With this fingerprints detection apparatus, when a finger 1 is put on the protection film 6 of the fingerprints sensor chip 2, a capacitance $C_s$ [$C_{s1}$, $C_{s2}$] formed between the detection electrodes 4 and the surface of the finger 1 depending on unevenness of a fingerprints is detected, whereby a so-called fingerprints pattern is lifted.

The capacitance $C_s$ formed between the detection electrodes 4 and the surface of finger 1 becomes larger in its value at a protuberance of the fingerprints because of a shorter distance between the protuberance and detection electrodes 4, whereas it becomes smaller in its value at a recess of the fingerprints because of a longer distance between the recess and detection electrodes 4. Therefore, by detecting the capacitance $C_s$, the fingerprints detection apparatus can lift the fingerprints pattern 7.

The surface of the fingerprints sensor chip 2 described above is exposed because of its structure in which the surface of the chip is touched by a finger. Accordingly, a ball-point pen, a coin and the like may bump against the chip surface. For this reason, the protection film 6 needs to have a sufficient mechanical strength. Besides, the protection film 6 is required to have a high dielectric constant and also have a stopping performance against mobile ions for preventing the invasion of those ions. An example of the mobile ions is Na ions contained in sweat on the surface of finger.

At present, the protection film of silicon nitride, polyimide and the like are generally used in the semiconductor process. However, when these films are used for the protection film 6 of the fingerprints sensor chip 2 described above, a problem is raised that a crack will occur by, for example, an act of pricking the surface of the film with a pen point. If a crack occurs in the protection film 6, the mobile ions can not be prevented from invading, so that characteristics of a semiconductor device connected to each detection electrode 4, namely, a switching device (e.g. MOS transistor) formed on the semiconductor substrate 3 will change.

It is due to an insufficient mechanical strength of the protection film 6 itself that a crack occurs in the protection film 6, but a main cause thereof is insufficient Vickers hardness of the detection electrodes 4.

At present, wiring materials of aluminum or copper are generally used in the semiconductor process, but they are small in the Vickers hardness as compared with the protection film of silicon nitride, etc. If aluminum or copper is used in the detection electrodes, when an external stress F is applied thereto as shown in FIG. 5, then the detection electrodes 4 will bend first. Depending on the bending amount of the detection electrodes 4, the protection film 6 also bends and cracks 8 will occur in the protection film 6, further in the insulation film 5 thereunder.

In other words, a tolerance to crack of the protection film 6 depends on the Vickers hardness of detection electrodes 4 rather than on the mechanical strength of protection film 6 itself, and thus the tolerance goes smaller than the ability of protection film 6. This raises another problem.

The same is applicable to the wiring 9 beneath the detection electrodes 4. As is shown in FIG. 6, even if materials of high Vickers hardness is employed in the detection electrodes 4, when the Vickers hardness of wiring 9 is small, the wiring 9 will bend first if an external force F is applied. Depending on the bending amount of wiring 9, the detection electrodes 4 and also the protection film 6 will bend, thereby causing cracks 8 to be occurred in the protection film 6 and insulation film 5.

DISCLOSURE OF INVENTION

The present invention provides a fingerprints detection apparatus in which the Vickers hardness of the detection electrodes in a sensor portion as well as the wiring beneath detection electrodes is increased, and the occurrence of cracks in a protection film and the like is restrained.

The fingerprints detection apparatus according to the present invention has the structure of capacitance detection type, including the sensor portion which has an insulation film formed so as to cover a plurality of detection electrodes arranged like an array, the detection electrodes being formed of a refractory metal or a compound of refractory metal. More preferably, the detection electrodes as well as the wiring beneath the detection electrodes are formed of a refractory metal or a compound of refractory metal. The refractory metal includes Ti, Ta, W, and Mo, any one of which can be employed as such. The compound of refractory metal includes compounds of Ti, Ta, W, and Mo, any one of which can be employed as such.

In the fingerprints detection apparatus according to the present invention, because the detection electrodes or the detection electrodes as well as the wiring just thereunder in the sensor portion are formed of a refractory metal or a compound of refractory metal, the Vickers hardness of detection electrodes and wiring increases. For this reason, the mechanical strength of insulating protection film improves and the occurrence of cracks in insulating protection film is restrained even if a stress is applied from the outside.

According to the fingerprints detection apparatus of the present invention, by forming the detection electrodes, more preferably the detection electrodes and wiring just thereunder, of a refractory metal with high Vickers hardness or a compound of the refractory metal, particularly any one of Ti, Ta, W, and Mo, or any one of compounds of Ti, Ta, W, and Mo, a tolerance to cracks of the insulating protection film can be improved. Therefore, it is possible to provide a highly reliable fingerprints detection apparatus capable of restraining the occurrence of cracks in insulation film due to, for example, an inadvertent external stress and preventing the change of characteristics of the cell selection switching element.

BEST MODE FOR CARRYING OUT THE INVENTION

An embodiment of the present invention will be described below with reference to the accompanying drawings.

Figure 1:
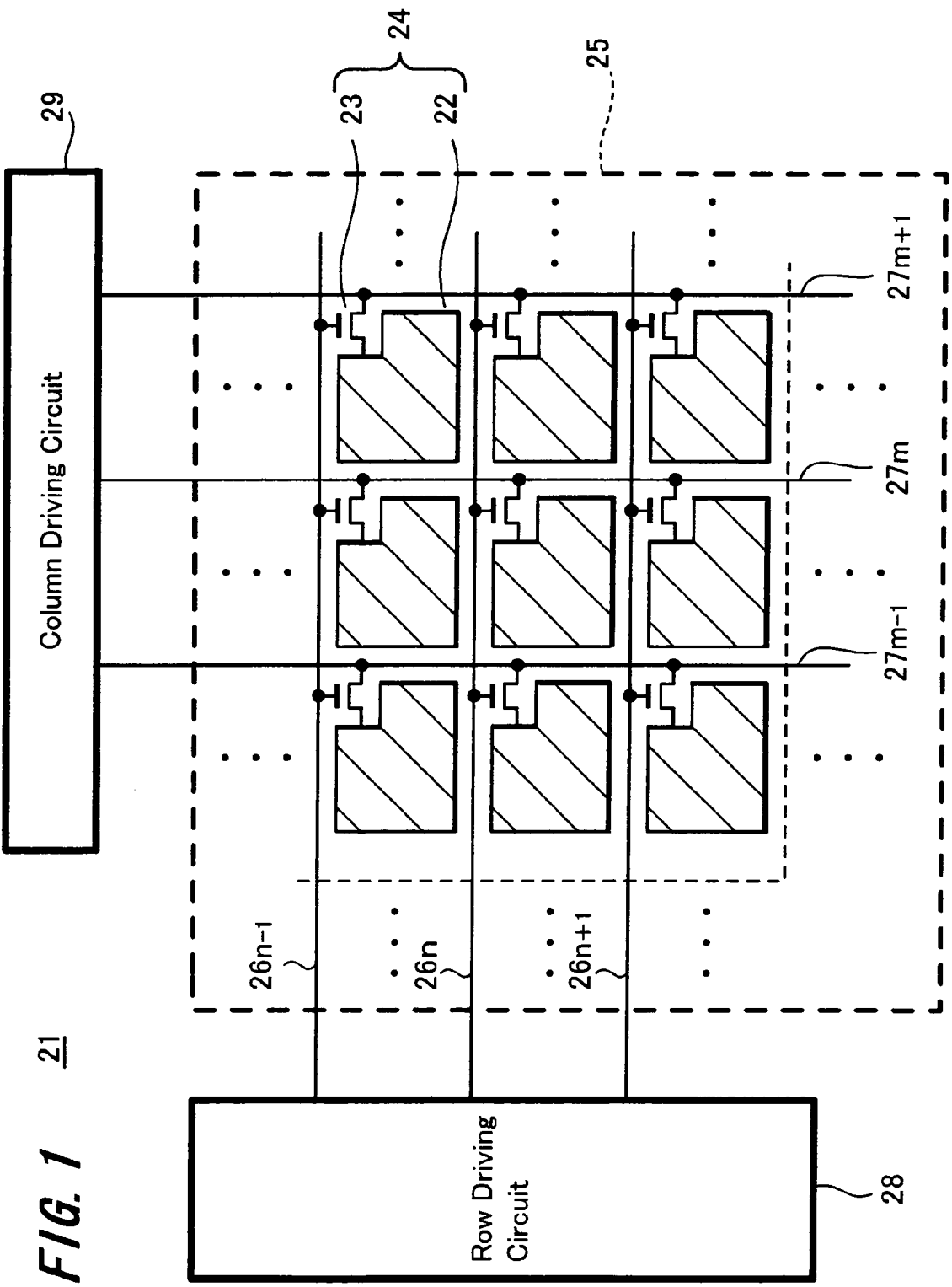
FIG. 1 is a schematic structure diagram showing an embodiment of the fingerprints detection apparatus according to the present invention.

FIG. 1 shows a whole schematic structure of a fingerprints detection apparatus by the capacitance detection method according to the present invention. The fingerprints detection apparatus 21 according to this embodiment includes a sensor portion (a so-called fingerprints sensor chip) 25 in which unitary cells 24 are arranged like an array, which cell 24 is made up of a detection electrode 22 and a cell selection switching device (e.g. a MOS transistor) 23 connected to the detection electrode 22. To these unitary cells 24 are wired row selecting lines 26 [$26_{n-1}$, $26_n$, $26_{n+1}$ . . . ] and column sensing lines 27 [$27_{m-1}$, $27_m$, $27_{m+1}$ . . . ] in a matrix fashion. A gate of each cell selection switching device 23 is connected to the respective row selecting lines 26 [$26_{n-1}$, $26_n$, $26_{n+1}$ . . . ]. A drain of each cell selection switching device 23 is connected to the respective column sensing lines 27 [$27_{m-1}$, $27_{m+1}$ . . . ]. A source of each cell selection switching device 23 is connected to each detection electrode 22. Each one end of the row selecting lines 26 [$26_{n-1}$, $26_n$, $26_{n+1}$ . . . ] is connected to a row driving circuit 28. Each one end of the column sensing lines 27 [$27_{m-1}$, $27_m$, $27_{m+1}$ . . . ] is connected to a column driving circuit 29 through capacitance detecting means(not shown) including an output line, etc. depending on the kind of capacitance detection method (a current charge method, a voltage charge method).

Figure 2:
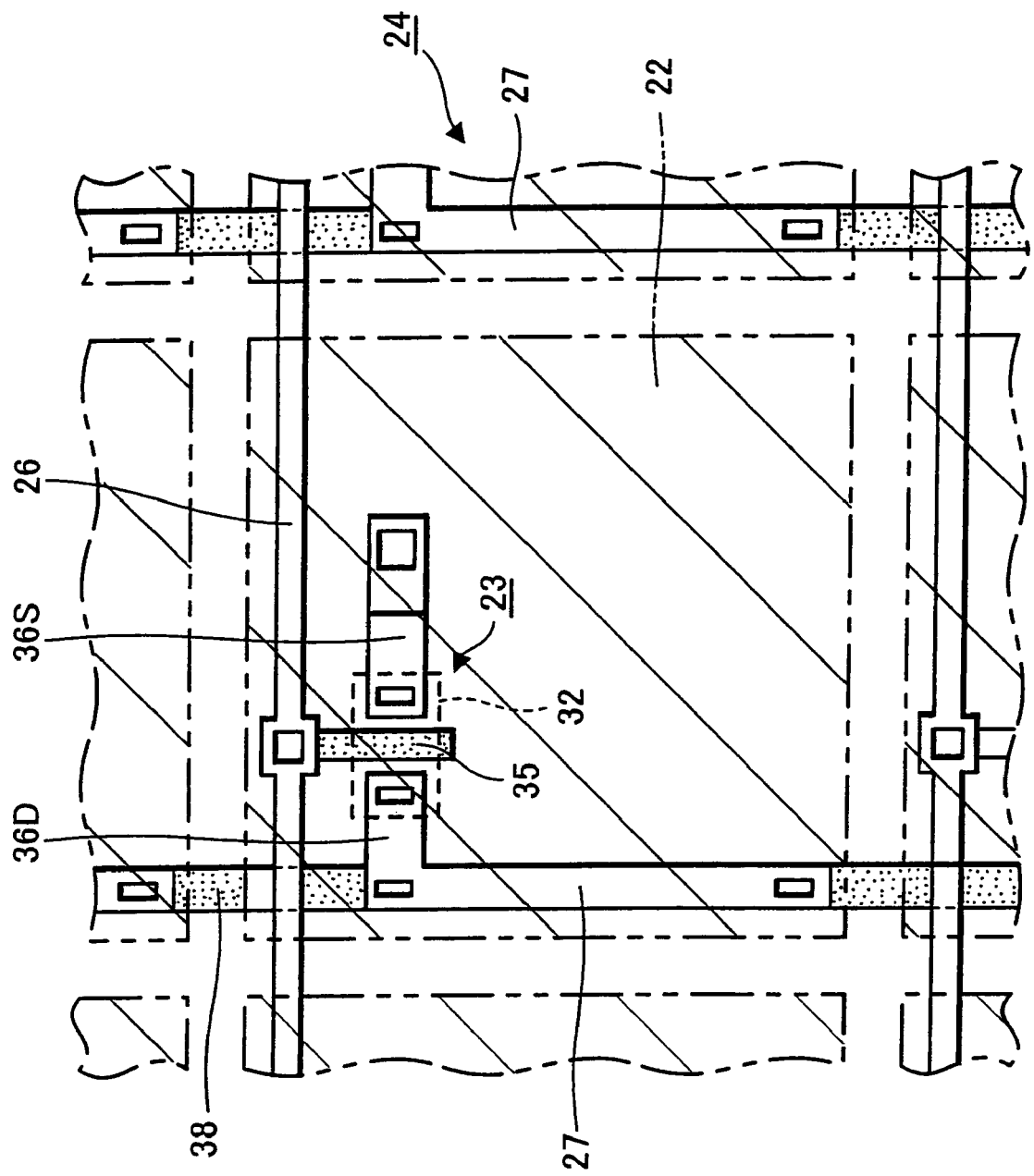
FIG. 2 is a plan of a unitary cell of the fingerprints detection apparatus in FIG. 1.
Figure 3:
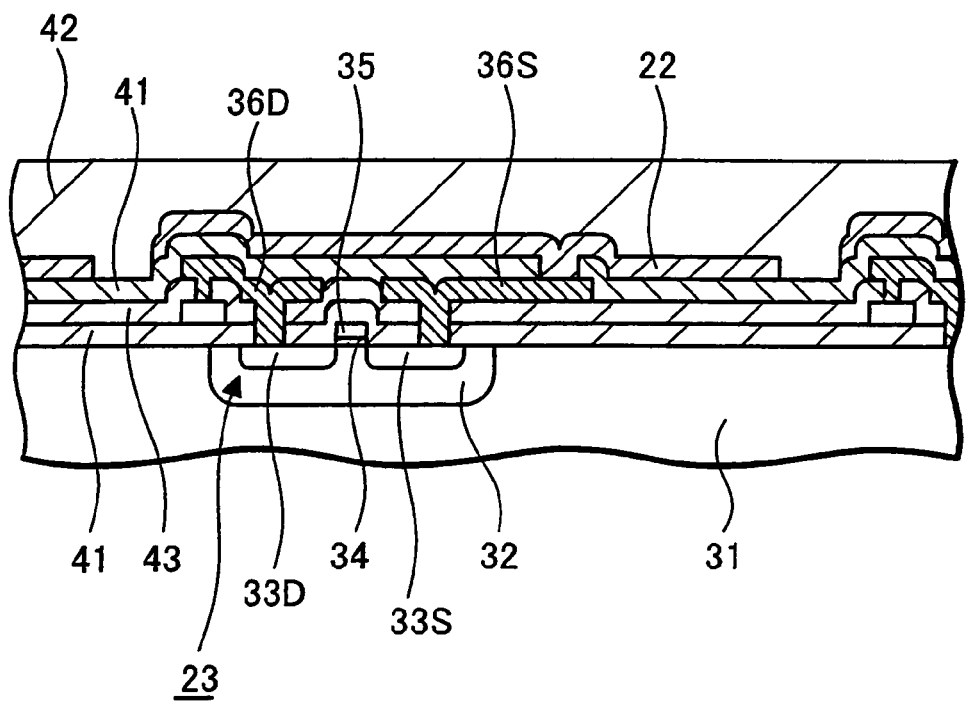
FIG. 3 is a vertical section of the unitary cell of the fingerprints detection apparatus in FIG. 1.

FIG. 2 and FIG. 3 are a plan and a vertical section for showing the structure of the unitary cell 24 made up of the detection electrode 22 and cell selection switching device 23, respectively.

The unitary cell 24 is formed on a semiconductor substrate 31 of a first conductivity type constituting the sensor portion 25. In this example, on the first conductivity type semiconductor substrate (e.g. silicon substrate) 31 is formed a semiconductor well area 32 of a second conductivity type. In this semiconductor well area 32 are formed a source area 33S and a drain area 33D of the first conductivity type. On the semiconductor well area 32 is formed a gate electrode 35 made of, e.g. polycrystalline silicon through a gate insulation film 34. Further, a source electrode 36S and a drain electrode 36D respectively connected to the source area 33S and drain area 36D are formed, thus making a MOS transistor (e.g. n-channel MOS transistor) 23 to be formed, which serves as the cell selection switching device. The drain electrode 33D of the MOS transistor 23 is formed integrated with the column sensing lines 27. Additionally, a part of the column sensing lines 27 is formed of polycrystalline silicon 38 in this example. Insulation films 41 serving as interlayer films are formed so as to cover the MOS transistor 23. On the insulation film 41 is formed the detection electrode 22 connected to the source electrode 36S through a contact hole. Further, an insulating protection film 42 is formed over all surface of the sensor portion 25 so as to cover the detection electrodes 22. The insulating protection film 42 is formed of silicon nitride, silicon oxide and so on. In this example, it is formed of a silicon nitride film. In this way, the unitary cell 24 is constructed.

In this embodiment, particularly the detection electrodes 22 are formed of a refractory metal with large Vickers hardness, or a compound of the refractory metal. More preferably, the detection electrodes 22 and the wiring just thereunder, namely, the wiring including the row selecting lines 26, the column sensing lines 27 (in this example, polycrystalline silicon portions 38 are excluded.), source electrodes 36S and drain electrodes 36D are formed of the refractory metal with large Vickers hardness, or the compound of the refractory metal.

Any one of Ti, Ta, W, Mo may be employed as the refractory metal. Giving examples of the Vickers hardness, that of Ti is 260 kg/mm$^2$; That of W is 430 kg/mm$^2$; That of Mo is 290 kg/mm$^2$. By the way, that of Al is 35 kg/mm$^2$, and that of Co is 85 kg/mm$^2$.

Any one of compounds of Ti, Ta, W, Mo may be employed as the compound of refractory metal. For example, TiC, TiN, WC, W$_2$C, MoC, Mo$_2$C and the like can be employed.

Of these refractory metals or their compounds, the most preferable material is W. The reason is that it has the highest melting point, low resistance and the largest hardness.

The fingerprints detection apparatus 21 operates as follows.

When a finger is put on the insulating protection film 42 of sensor portion 25, electric charge depending on capacitance is accumulated in the detection electrodes 22 corresponding to the protuberance and recess of fingerprints. The row driving circuit 28 gives row driving signals in order of the row selecting lines 26 [$26_{n-1}$, $26_n$, $26_{n-1}$ . . . ] by scanning in a column direction, thus causing the cell selection switching devices 23 in each row to be on from row to row and the relevant detection electrodes 22 to be selected. This makes the electric charges accumulated in each detection electrode 22 of selected rows to be supplied to the capacitance detecting means through each cell selection switching device 23 and the column sensing lines 27 [$27_{m-1}$, $27_m$, $27_{m+1}$ . . . ]. On the other hand, the column driving circuit 29 outputs column driving signals sequentially by scanning in a row direction, and electric voltage into which the electric charge of detection electrodes 22 is inverted is outputted sequentially from the capacitance detecting means through the output line. This makes it possible to detect the fingerprints pattern.

Figure 4:
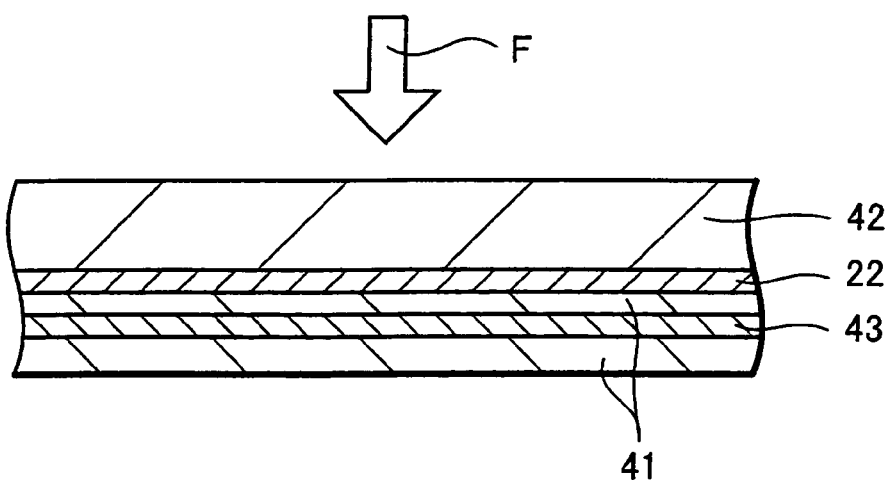
FIG. 4 is a vertical section for explaining the influence due to an external stress on the sensor portion of the fingerprints detection apparatus according to the present invention.
Figure 5:
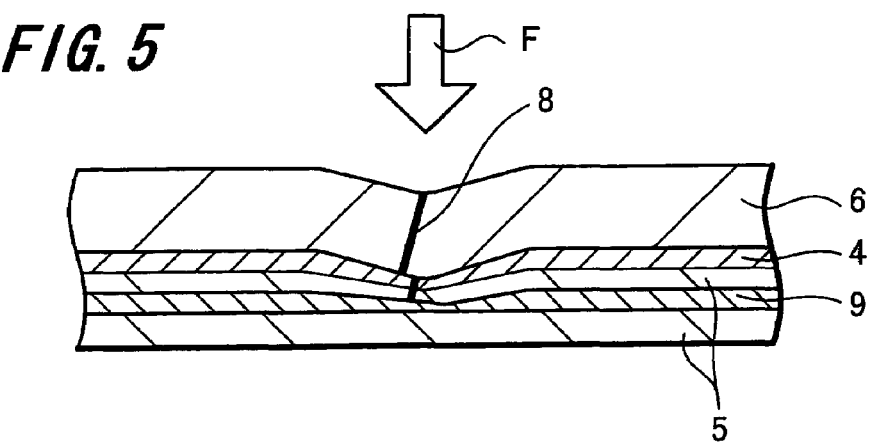
FIG. 5 is a vertical section for explaining an example of the influence due to an external stress on the sensor portion of the conventional fingerprints detection apparatus.
Figure 6:
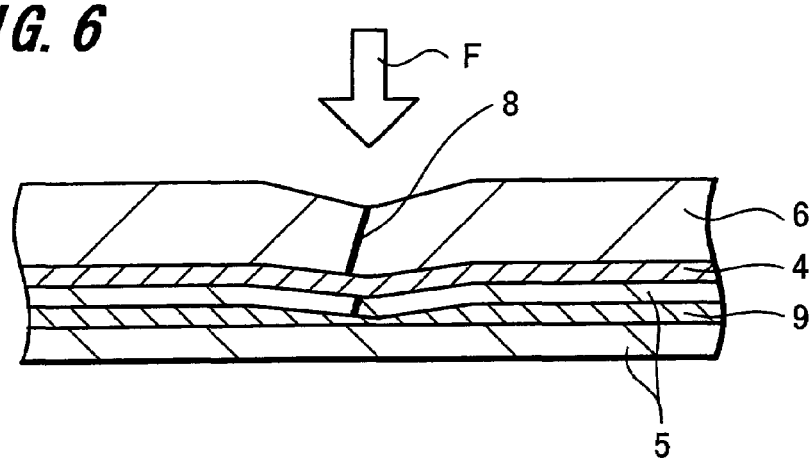
FIG. 6 is a vertical section for explaining another example of the influence due to an external stress on the sensor portion of the conventional fingerprints detection apparatus.
Figure 7:
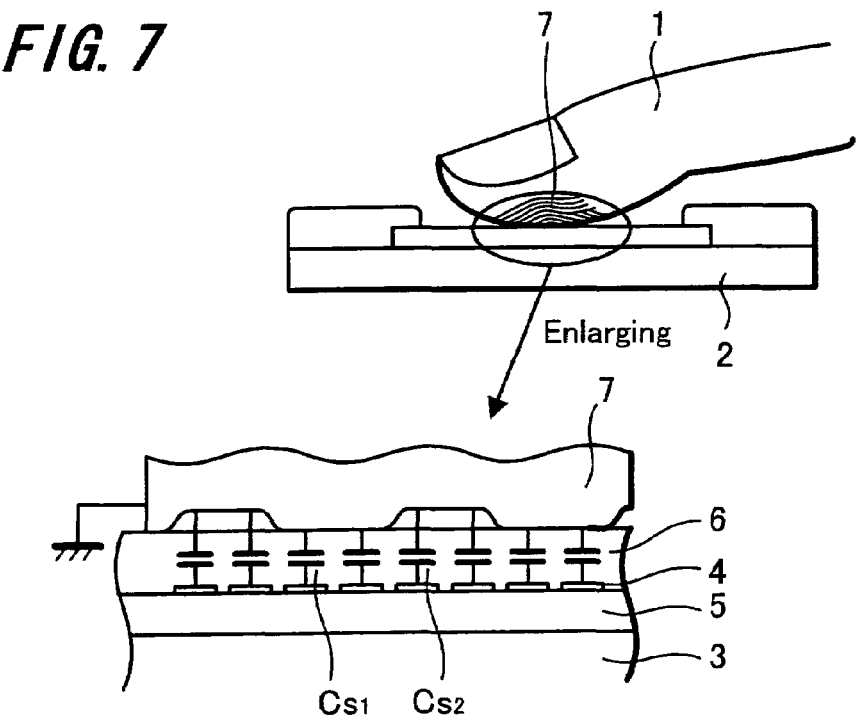
FIG. 7 is a principle diagram of the fingerprints detection apparatus capable of sensing capacitance.

According to the fingerprints detection apparatus 21 of the above described embodiment, by forming the detection electrodes 22 of its sensor portion 25, more preferably the detection electrodes 22 and the wiring 43 thereunder (row selecting lines 26, column sensing lines 27, electrodes 36S, 36D and the like: see FIG. 4) of the refractory metal of Ti, Ta, W, Mo or compounds of those metals, the Vickers hardness of the detection electrodes 22 and the wiring beneath the detection electrodes 22 is made larger. Therefore, even if a stress F is applied to the surface of sensor portion 25, i.e. insulating protection film 42 from the outside, the bending amount of the detection electrodes 22 and the wiring thereunder greatly decreases and in turn the bending amount of the insulating protection film 42 is greatly reduced.

In this manner, a tolerance to cracks of the insulating protection film 42 can be improved by reducing the bending amount of insulating protection film 42. In other words, cracks will be hard to occur in the insulating protection film 42, further in the interlayer insulation film 41 against the external stress F. Therefore, it is possible to provide a highly reliable fingerprints detection apparatus 21 capable of restraining the occurrence of cracks due to, for example, an inadvertent external stress and preventing the change of the characteristic of cell selection switching device 23.

The invention claimed is:

1. A fingerprint detection apparatus by a capacitance detection method, including a sensor portion in which an insulating protection film is formed so as to cover detection electrodes arranged like an array, characterized in that the detection electrodes and a wiring beneath the detection electrodes are formed substantially entirely of a refractory metal or a compound of the refractory metal and are substantially void of silicon, and wherein the wiring beneath the detection electrodes includes one or more of a row selecting line, a column sensing line, a source electrode of a transistor, and a drain electrode of a transistor.

2. A fingerprint detection apparatus by a capacitance detection method, including a sensor portion in which an insulating protection film is formed so as to cover detection electrodes arranged like an array, characterized in that a wiring beneath the detection electrodes is formed substantially entirely of a refractory metal or a compound of the refractory metal and is substantially void of silicon, and characterized in that the wiring beneath the detection electrodes includes one or more of a row selecting line, a column sensing line, a source electrode of a transistor, and a drain electrode of a transistor.

3. The fingerprint detection apparatus according to claim 2, characterized in that the wiring beneath the detection electrodes is formed of any one of Ti, Ta, W, and Mo.

4. The fingerprint detection apparatus according to claim 2, characterized in that the wiring beneath the detection electrodes is formed of any one of compounds of Ti, Ta, W, and Mo.

* * * * *